US009641027B2

(12) United States Patent
Tsuji et al.

(10) Patent No.: US 9,641,027 B2
(45) Date of Patent: May 2, 2017

(54) WIRELESS POWER FEEDING SYSTEM AND WIRELESS POWER FEEDING METHOD

(75) Inventors: Masayoshi Tsuji, Tokyo (JP); Wataru Hattori, Tokyo (JP); Masahiro Tanomura, Tokyo (JP); Shuhei Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 434 days.

(21) Appl. No.: 14/345,602

(22) PCT Filed: May 25, 2012

(86) PCT No.: PCT/JP2012/003437
§ 371 (c)(1),
(2), (4) Date: Mar. 18, 2014

(87) PCT Pub. No.: WO2013/042291
PCT Pub. Date: Mar. 28, 2013

(65) Prior Publication Data
US 2014/0339913 A1 Nov. 20, 2014

(30) Foreign Application Priority Data
Sep. 21, 2011 (JP) .................................. 2011-205893

(51) Int. Cl.
*H01F 37/00* (2006.01)
*H02J 17/00* (2006.01)
(Continued)

(52) U.S. Cl.
CPC .............. *H02J 17/00* (2013.01); *B60L 11/182* (2013.01); *H01F 38/14* (2013.01); *H02J 5/005* (2013.01); *H02J 7/025* (2013.01); *B60M 7/00* (2013.01)

(58) Field of Classification Search
CPC ........ B60L 11/182; H01F 38/14; H02J 17/00; H02J 5/005; H02J 7/025; B60M 7/00
(Continued)

(56) References Cited

U.S. PATENT DOCUMENTS 7,462,951 B1 * 12/2008 Baarman .................. B25H 3/02
307/150
8,890,366 B2 * 11/2014 Wang ...................... H02J 5/005
307/10.2
(Continued)

FOREIGN PATENT DOCUMENTS

CN 101471587 A 7/2009
CN 102013717 A 4/2011
(Continued)

OTHER PUBLICATIONS

International Search Report corresponding to PCT/JP2012/003437 dated Aug. 21, 2012 (3 pages).
(Continued)

*Primary Examiner* — Hal Kaplan
*Assistant Examiner* — Toan Vu
(74) *Attorney, Agent, or Firm* — Wilmer Cutler Pickering Hale and Dorr LLP

(57) ABSTRACT

A wireless power feeding system capable of long distance and highly efficient space transmission of power is provided. A wireless power feeding system includes a power transmitter, a power receiver, and a power receiving body. The power transmitter generates electromagnetic waves. The power receiver is supplied with power by means of the electromagnetic waves received from the power transmitter using a magnetic field resonance phenomenon. The power receiving body is inserted into an electromagnetic field created by the power transmitter and the power receiver, and receives power by means of the electromagnetic field.

20 Claims, 14 Drawing Sheets

(51) Int. Cl.
*H02J 5/00* (2016.01)
*B60L 11/18* (2006.01)
*H01F 38/14* (2006.01)
*H02J 7/02* (2016.01)
*B60M 7/00* (2006.01)

(58) Field of Classification Search
USPC .......................................................... 307/104
See application file for complete search history.

(56) References Cited

U.S. PATENT DOCUMENTS

| | | | |
|---|---|---|---|
| 2009/0174263 A1* | 7/2009 | Baarman | H02J 5/005 307/104 |
| 2010/0264747 A1* | 10/2010 | Hall | B60L 11/182 307/104 |
| 2011/0018359 A1 | 1/2011 | Wada | |
| 2011/0241612 A1* | 10/2011 | Ryu | H02J 5/005 320/108 |

FOREIGN PATENT DOCUMENTS

| | | |
|---|---|---|
| CN | 102027686 A | 4/2011 |
| CN | 102157987 A | 8/2011 |
| JP | 2003-502992 A | 1/2003 |
| JP | 2008-043125 A | 2/2008 |
| JP | 2009-501510 A | 1/2009 |
| JP | 2010-088151 A | 4/2010 |
| JP | 2010-239838 A | 10/2010 |
| JP | 2010-538596 A | 12/2010 |
| JP | 2011-030317 A | 2/2011 |
| JP | 2011-097671 A | 5/2011 |
| JP | 2011-160634 A | 8/2011 |
| JP | 2011-525098 A | 9/2011 |
| JP | 2012-039815 A | 2/2012 |
| WO | WO-2011/108403 A1 | 9/2011 |
| WO | WO-2012/001959 A1 | 1/2012 |

OTHER PUBLICATIONS

Marin Soljacic et al., "Wireless Power Transfer via Strongly Coupled Magnetic Resonances," Science, vol. 317, No. 5834, 2007, pp. 83-86.
Chinese Office Action corresponding to Chinese Application No. 201280046320.X, dated Aug. 25, 2015, 10 pages.
Chinese Office Action issued by the State Intellectual Property Office of the People's Republic of China for Application No. 201280046320, dated Jan. 11, 2016 (17 pages).
Japanese Notification of Reasons for Refusal issued in corresponding Japanese Patent Application No. 2013-534571, dated Apr. 12, 2016, 14 pages.
Japanese Office Action issued by the Japan Patent Office for Application No. 2013-534571 dated Jul. 19, 2016 (14 pages).

* cited by examiner

WIRELESS POWER FEEDING SYSTEM AND WIRELESS POWER FEEDING METHOD

CROSS-REFERENCE TO RELATED APPLICATIONS

This application is a national stage application of International Application No. PCT/JP2012/003437 entitled "Wireless Power Feeding System and Wireless Power Feeding Method," filed on May 25, 2012, which claims the benefit of the priority of Japanese patent application No. 2011-205893, filed on Sep. 21, 2011, the disclosures of each of which are hereby incorporated by reference in their entirety.

TECHNICAL FIELD

The present invention relates to a wireless power feeding system and a wireless power feeding method for wirelessly transmitting power.

BACKGROUND ART

Wireless power transmission, which is also called non-contact charging technology, is applied to various products today. Known forms of wireless power transmission are using electromagnetic induction and radio waves. Wireless power transmission via electromagnetic induction is triggered by the discovery of Faraday's law in 1831, followed by the invention of the transformer in 1836. The transmission distance in the electromagnetic induction-type wireless power transmission is several mm or less, and the operating frequency is several hundred KHz or less in many cases. The electromagnetic induction-type is characterized in that the transmission distance is short and there is no leakage of the magnetic field, though the amount of power transmission depends on design. The wireless power transmission requires no connector and allows easy enhancement of waterproofness, and it is used in products such as chargers of electric toothbrushes, shavers and the like, for example.

On the other hand, wireless power transmission via radio waves (microwaves) has been under continuous research and development since confirmation of the existence of electromagnetic waves by Hertz in 1888 and the wireless power transmission experimental design (150 kHz, 1 MW) by Tesla in 1904. In recent years, the radio wave (microwave)-type wireless power transmission is applied also to wireless article management systems (RF-ID) and the like. Because the radio wave (microwave)-type uses radio waves, the electromagnetic field radiates outward and energy is scattered. Therefore, this type is characterized in that while long distance power transmission (up to several tens of meters) is possible, the transmission efficiency for power receiving is as low as several % or less. Note that the transmission efficiency is the ratio of the power transmitted by a transmitter and the power received by a receiver, which is the power transmission rate in a space.

The main demand for the wireless power transmission technology is to transmit power over longer distances with higher efficiency. In 2006, the wireless power feeding technology via magnetic resonance was proposed in Massachusetts Institute of Technology (MIT) (Patent Literature 1). In the magnetic resonance system, a resonance phenomenon is produced by placing two coils having high inductance (L) in each of the transmitting side and the receiving side to realize power transmission over longer distances with higher efficiency.

In the magnetic resonance wireless power transmission, the transmission efficiency of about 45% is achieved when the resonance frequency is 10 MHz and the distance between the coils is 2 m (Non Patent Literature 1). The transmission efficiency of the whole power transmission system is about 15%, which is the product in the whole system including the efficiency of a power transmitting device (mainly, an amplifier), 37.5%, and the efficiency of a power receiving device (mainly, a rectifier), 90%. Thus, when the input power to the power transmitting system is 400 W, it is possible to light a lamp of 60 W at 2 m away. In this manner the magnetic resonance method can feed power over longer distances with relatively high efficiency compared with the electromagnetic induction method.

As the electromagnetic induction system, an example where a power receiving body is placed within an electromagnetic field created by power transmitting and receiving coils is disclosed (Patent Literature 2). In this example, an AC power supply device is connected to each of the power transmitting and receiving coils, and switching of power transmission and reception can be made. Further, among the energy that creates the electromagnetic field, the energy that is not received by the power receiving body is a loss. Note that, because the electromagnetic field is created by electromagnetic induction, the distance between the power transmitting and receiving coils cannot be increased, and it is an extremely short distance that is approximately $1/10$ the distance in the magnetic resonance system.

Further, as the magnetic resonance system, a configuration that includes a main power transmitting device and two or more power receiving devices and further includes an auxiliary power receiving device for power recovery is disclosed (Patent Literature 3). This configuration is designed principally for magnetic resonance power feeding to the two or more power receiving devices, and a condition for receiving power is to match resonant frequencies. This example is a one-to-many magnetic resonance power feeding system from one power transmitting device to multiple power receiving devices. In this configuration, when a plurality of power receiving devices are mounted, a certain distance needs to be maintained between the respective power receiving devices. This is because if the power receiving devices are close, coupling between resonators included in the respective power receiving devices is too high, and the resonant frequency of each power receiving device deviates from a set value, which causes significant degradation of transmission efficiency to the power receiving device. Although the minimum distance between power receiving bodies at which the deviation of the resonant frequency of each power receiving device is practically negligible depends on design of a power transmitter and receiver and a power receiving device, constraints are imposed on the distance between power receiving devices in any case.

CITATION LIST

Patent Literature

PTL1: Published Japanese Translation of PCT International Publication for Patent Application, No. 2009-501510
PTL2: Published Japanese Translation of PCT International Publication for Patent Application, No. 2003-502992
PTL3: Japanese Unexamined Patent Publication No. 2010-239838

Non Patent Literature

NPL1: Marin Soljacic et al., "Wireless Power Transfer via Strongly Coupled Magnetic Resonances", SCIENCE, Vol. 317, No. 5834, pp. 83-86.

SUMMARY OF INVENTION

Technical Problem

However, the inventors have found that there is a drawback in the above-described magnetic resonance system. As described above, although longer distance transmission using a resonance phenomenon is possible in the magnetic resonance system, power can be transmitted only within the range where the magnetic flux can reach between the power transmitting and receiving coils, and the range is generally approximately 1/20 a resonant wavelength. This transmission distance is substantially the same as the diameter of the power transmitting and receiving coil. In other words, the effective transmission distance in the magnetic resonance system is approximately the diameter of the power transmitting and receiving coil. For example, when the resonant frequency is 10 MHz, the wavelength is 30 m, and therefore the transmission distance is 1.5 m, which is 1/20 the wavelength. In the experiments in MIT described above, the coil diameter is 0.6 m, which is smaller than 1.5 m. Thus, the transmission efficiency between the power transmitting and receiving coils is 90% with the coil interval of 1 m and 45% with the coil interval of 2 m.

The extension of the transmission distance in the magnetic resonance system can be achieved by lowering the resonant frequency, or, increasing the wavelength. However, increasing the wavelength results in an increase in the coil diameter. Particularly, because the receiving coil is closely related to the size of equipment on which it is mounted, there are almost no applications for a receiving coil with a diameter of several meters or more under the present conditions. Therefore, the development of wireless power feeding technique that enables transmission over a feeding distance of several meters or more with high efficiency and allows mounting on a relatively small device such as portable equipment is desired.

The present invention has been made in view of the above circumstances, and an exemplary object of the present invention is to provide a wireless power feeding system and a wireless power feeding method capable of long distance and highly efficient space transmission of power.

Solution to Problem

A wireless power feeding system according to one exemplary aspect of the present invention includes a power transmitter that generates electromagnetic waves, a power receiver that is supplied with power by means of the electromagnetic waves received from the power transmitter using an electric field or magnetic field resonance phenomenon, and a power receiving body that is inserted into an electromagnetic field created by the power transmitter and the power receiver and receives power by means of the electromagnetic field.

A wireless power feeding method according to one exemplary aspect of the present invention includes creating an electromagnetic field between a power transmitter and a power receiver using an electric field or magnetic field resonance phenomenon, and inserting a power receiving body into the electromagnetic field so that the power receiving body receives power.

Advantageous Effects of Invention

According to the present invention, it is possible to provide a wireless power feeding system and a wireless power feeding method capable of long distance and highly efficient space transmission of power.

DESCRIPTION OF EMBODIMENTS

Figure 1:
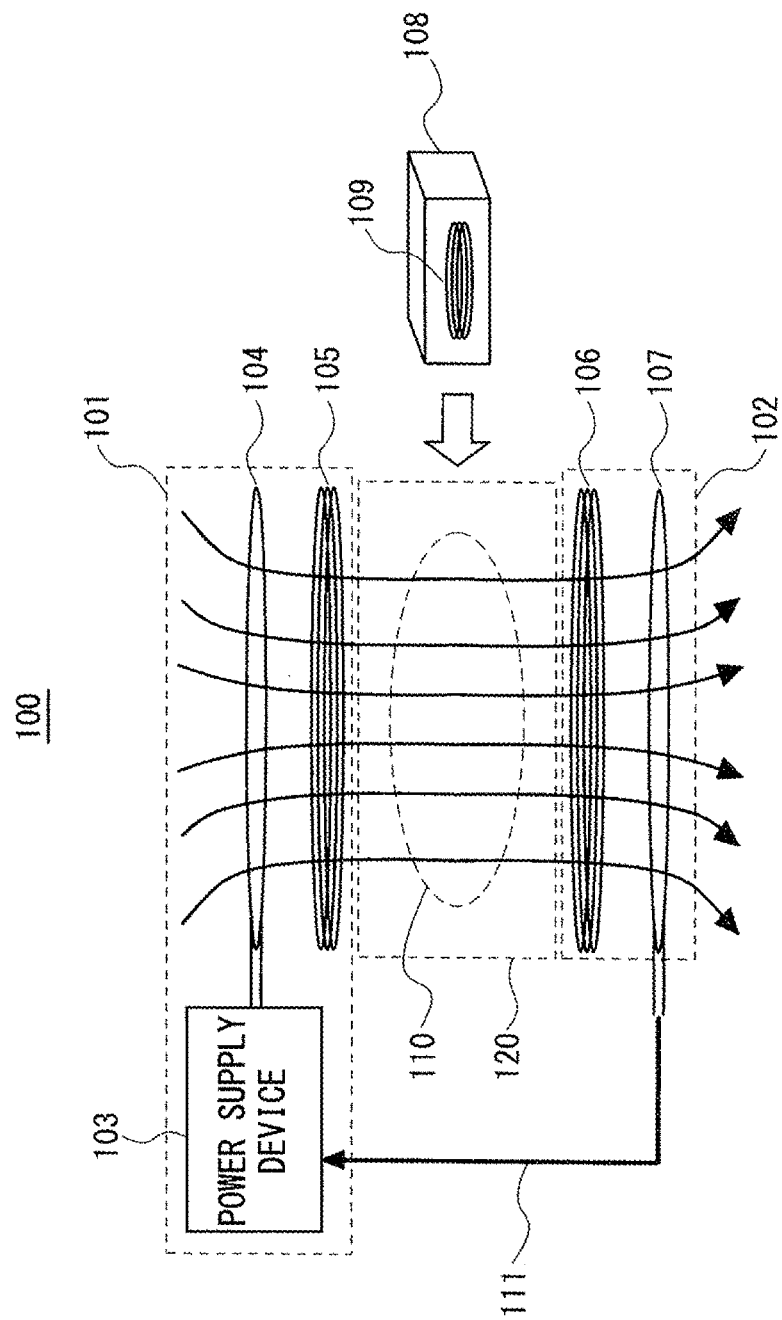
FIG. 1 is a front view schematically showing a configuration of a wireless power feeding system 100 according to a first exemplary embodiment.

Exemplary embodiments of the present invention will be described hereinafter with reference to the drawings. In the drawings, the identical elements are denoted by the identical reference symbols, and the redundant explanation thereof is omitted.

First Exemplary Embodiment

First, a wireless power feeding system 100 according to a first exemplary embodiment of the invention is described hereinafter. FIG. 1 is a front view schematically showing the configuration of the wireless power feeding system 100 according to the first exemplary embodiment. As shown in FIG. 1, the wireless power feeding system 100 includes a power transmitter 101 and a power receiver 102. The power transmitter 101 is a device that wirelessly transmits power. The power receiver 102 is a device that receives power from the power transmitter 101. In the wireless power feeding system 100, an electromagnetic field is created in the space between the power transmitter 101 and the power receiver 102 by power transmission between the power transmitter 101 and the power receiver 102. In other words, power transmission is performed by means of magnetic resonance between the power transmitter 101 and the power receiver 102. Note that FIG. 1 schematically shows magnetic field lines 110 that are generated by the wireless power feeding system 100. Further, FIG. 1 shows the magnetic field lines 110 as a representative to show that electromagnetic waves are transmitted between the power transmitter 101 and the power receiver 102 and an electromagnetic field is created. Thus, it is not true in practice that only the magnetic field lines 110 exist between the power transmitter 101 and the power receiver 102. Hereinafter, the magnetic field lines 110 represent the electromagnetic field between the power transmitter 101 and the power receiver 102 as described above unless otherwise noted.

The power transmitter 101 includes a power supply device 103, a transmitter primary coil 104, and a transmitter secondary coil 105. The transmitter coils function to store magnetic energy and create a strong electromagnetic field between the transmitter coil and the receiver coil. Note that the transmitter secondary coil 105 is electrically isolated from the transmitter primary coil 104 and is electrically floating.

The power receiver 102 includes a receiver secondary coil 106 and a receiver primary coil 107. The power collected by the receiver primary coil 107 is fed back to the power supply device 103 through a feedback loop 111. The receiver primary coil 107 is electrically isolated from the receiver secondary coil 106 and is electrically floating.

Note that the resonant frequencies of the transmitter primary coil 104 and the transmitter secondary coil 105 in the power transmitter 101 and the receiver secondary coil 106 and the receiver primary coil 107 in the power receiver 102 are the same.

A power receiving body 108 that receives power supply from the wireless power feeding system 100 is inserted in a space 120 between the power transmitter 101 and the power receiver 102. The power receiving body 108 includes a receiving coil 109 that can receive power with a power specification desired by itself. Because the magnetic field lines 110 exist in the space 120, the power receiving body 108 can receive power supply by means of electromagnetic induction. Specifically, the power receiving body 108 receives a part of the power transmitted between the power transmitter 101 and the power receiver 102 by the receiving coil 109. In this case, the amount of power to be received is determined by the receiving coil 109. Particularly, the amount of received power largely depends on the receiving coil 109. Note that, in the case where a rectifier is placed in the receiving coil 109, the power in conformance with the specification of the power receiving body 108 can be received by the rectifier.

Note that the power receiving body 108 may include a plurality of receiving coils 109, and, in this case, the power obtained in each coil is combined as the received power. Further, the power receiving body 108 inserted in the space 120 is not limited to one, and a plurality of power receiving bodies may be inserted. In this case, each power receiving body can receive power from the electromagnetic field using their receiving coil 109.

The power receiving body 108 can always receive power as long as the power receiving body 108 is located in the space where an electromagnetic field is created, regardless of the position in the space. Accordingly, even when the power receiving body 108 is moving through the space 120, it can receive power in the same manner as when it is not moving. In the case where the power receiving body 108 includes a built-in battery, the power receiving body 108 can charge the battery as long as the power receiving body 108 is located in the space where an electromagnetic field is created.

Further, the receiving coil 109 included in the power receiving body 108 has a smaller coil diameter than the coils in the power transmitter 101 and the power receiver 102 in many cases. Therefore, there is a case where the received power of the receiving coil 109 does not reach the voltage and current that directly drive the power receiving body 108. In this case also, the power receiving body 108 continuously receives power to avoid early exhaustion of the battery, thereby extending the operation time of the power receiving body 108 or equipment on which the power receiving body 108 is mounted.

The rest of the power that is not received by the power receiving body 108 is input to the power receiver 102. The power input to the power receiver 102 is fed back to the power supply device 103 in the power transmitter 101 through the feedback loop 111.

Note that other elements, such as an amplifier, a rectifier and a control circuit, that are included in the wireless power feeding system 100 in addition to the power transmitter 101, the power receiver 102 and the power receiving body 108 are known elements and not directly related to the understanding of the wireless power feeding system 100 according to this exemplary embodiment, and therefore the description thereof is omitted.

The operation of the wireless power feeding system 100 is described hereinafter. In the wireless power feeding system 100, the function of creating an electromagnetic field in the space is implemented by the power transmitter 101 and the power receiver 102, and the function of receiving power is implemented by the power receiving body 108. Thus, a magnetic field having the magnetic field lines 110 is crated in the space 120 by the power transmitter 101 and the power receiver 102. The power receiving body is inserted in the created magnetic field and can receive power by means of magnetic resonance using the magnetic field lines 110.

Further, the power not received by the power receiving body 108 is received by the power receiver 102 and fed back to the power supply device 103 in the power transmitter 101. Thus, the power not received by the power receiving body 108 is recovered to minimize energy consumption for electromagnetic field creation. Accordingly, when focused on the power receiving body 108, highly efficient power transmission is achieved.

Figure 2:
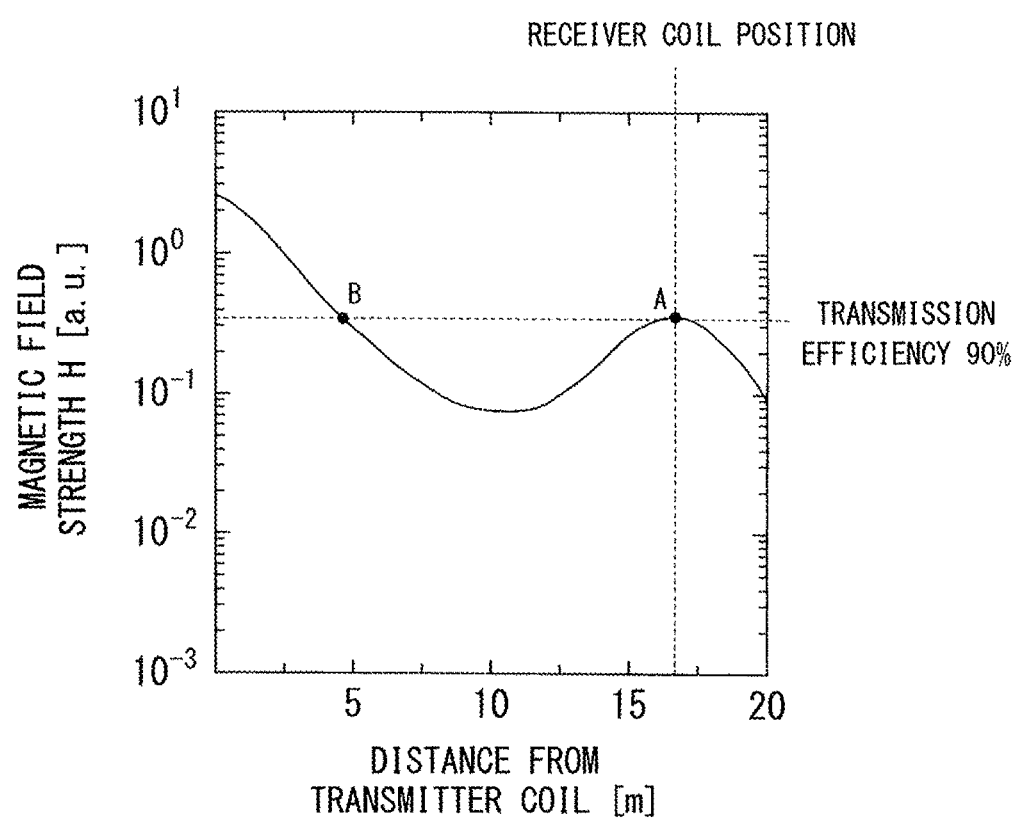
FIG. 2 is a graph showing an example of a three-dimensional simulation result of spatial electromagnetic field creation by magnetic resonance.

FIG. 2 is a graph showing one example of a three-dimensional simulation result of spatial electromagnetic field creation by magnetic resonance. FIG. 2 shows transmission efficiency and magnetic field strength distribution between the power transmitter and the power receiver in the case where the resonant frequency is 1 MHz (wavelength of 300 m), the diameter of coils in the power transmitter and the power receiver is 15 m, and the distance between the coils is 17 m. As shown in FIG. 2, highly efficient power transmission is possible even in long distance transmission of about 15 m by appropriate selection of the resonant frequency and design of the coil diameter (point A in FIG. 2). Further, transmission efficiency of 90% is attained even between the power transmitter and a position at a distance of 5 m from the power transmitter (point B in FIG. 2).

The point B in FIG. 2 is an example in the case where the power receiving body having a coil with a diameter of 15 m is placed in a position at a distance of 5 m from the power transmitter, and when an arbitrary power receiving body is placed in this position, the amount of received power in the power receiving body is determined depending on the characteristics of a receiving coil included in the power receiving body. Further, as the distance between the power transmitter and the power receiver is shorter, the magnetic field strength in the space between them is higher, and, in other words, the power receiving body at the position of the point B can obtain a greater amount of received power.

Therefore, according to the wireless power feeding system 100, the spatial electromagnetic field creation function (the power transmitter 101 and the power receiver 102) and the power receiving function (the power receiving body 108) are separated to thereby achieve long distance and highly efficient spatial power transmission.

Further, in the magnetic resonance system, the resonant frequencies of a power transmitting coil and a power receiving coil need to be the same. Therefore, it is necessary to design and manufacture each coil so that the resonant frequencies of the power transmitting coil and the power receiving coil are the same. Alternatively, at least one of the power transmitting coil and the power receiving coil needs to have an adjustment mechanism that matches the resonant frequencies. In this case, there is a constraint that high transmission efficiency power feeding can be done only when the resonant frequencies of the power transmitting coil and the power receiving coil are made to be the same by the adjustment mechanism. On the other hand, in the wireless power feeding system 100, the spatial electromagnetic field creation function and the power receiving function are separated, and the power receiving body receives power by means of electromagnetic induction. Therefore, it is possible to receive power with high efficiency in each power receiving body without consideration of a resonant frequency, thereby overcoming the problem in the magnetic resonance system described above.

Figure 3:
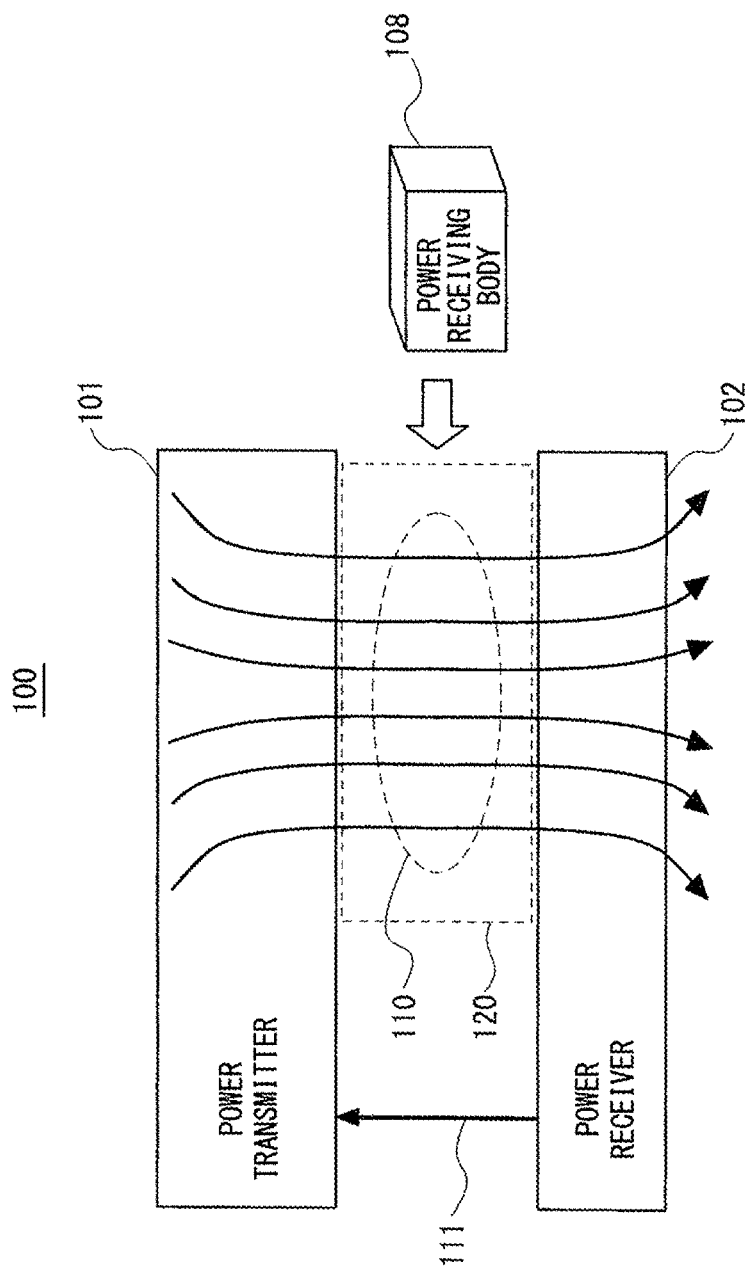
FIG. 3 is a block diagram schematically showing a configuration of the wireless power feeding system 100 according to the first exemplary embodiment.

Note that the configuration of the wireless power feeding system 100 according to this exemplary embodiment can be divided into blocks as described below. FIG. 3 is a block diagram schematically showing the configuration of the wireless power feeding system 100 according to the first exemplary embodiment. Specifically, the wireless power feeding system 100 includes the power transmitter 101 and the power receiver 102, and an electromagnetic field is created in the space 120 between the power transmitter 101 and the power receiver 102 by power transmission between the power transmitter 101 and the power receiver 102. Thus, power transmission is performed by means of magnetic resonance between the power transmitter 101 and the power receiver 102. Note that, in FIG. 3, the magnetic field lines 110 generated by the wireless power feeding system 100 are schematically shown as in FIG. 1.

The resonant frequencies of the power transmitter 101 and the power receiver 102 are the same. The power receiving body 108 is inserted in the space 120 between the power transmitter 101 and the power receiver 102. Because the magnetic field lines 110 exist in the space 120, the power receiving body 108 can receive power supply by means of electromagnetic induction. Thus, the power receiving body 108 can receive a part of the power transmitted between the power transmitter 101 and the power receiver 102 as the power in conformance with the specification of the power receiving body 108.

The power not received by the power receiving body 108 is received by the power receiver 102 and fed back to the power transmitter 101. Thus, the power not received by the power receiving body 108 is recovered to minimize energy consumption for electromagnetic field creation. Accordingly, when focused on the power receiving body 108, highly efficient power transmission is achieved.

Example 1

Figure 4:
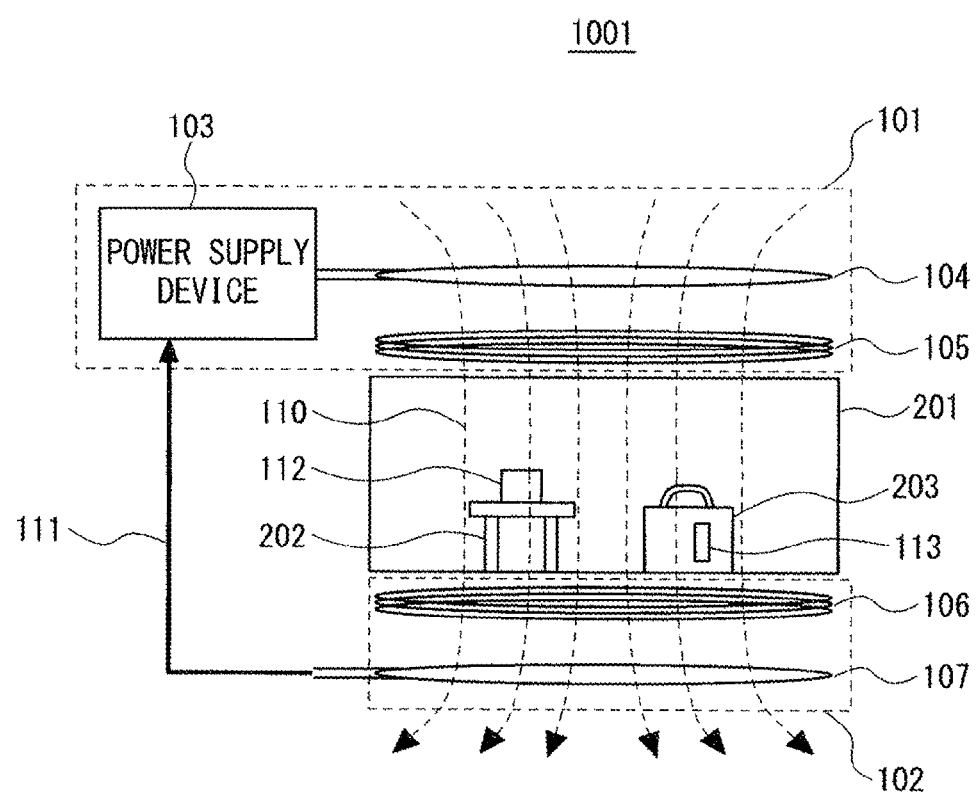
FIG. 4 is a front view schematically showing a configuration example of a wireless power feeding system 1001 according to an example 1.

A wireless power feeding system according to the example 1 of the present invention is described hereinafter. The example 1 relates to a wireless power feeding system 1001, which is an example in the case where the wireless power feeding system 100 is applied to a room in a building. FIG. 4 is a front view schematically showing the configuration example of the wireless power feeding system 1001 according to the example 1. As shown in FIG. 4, the power transmitter 101 is mounted on the backside of the ceiling of a room 201, and the power receiver 102 is mounted under the floor of the room 201. To simplify the drawing, the magnetic field lines 110 are shown by dotted lines in FIG. 4. In this example, the diameter of the coils of the power transmitter 101 and the power receiver 102 is 15 m, and the distance between the coils is 5 m. Further, the resonant frequency is 1 MHz. The transmitter primary coil 104 and the receiver primary coil 107 are circular single layer coils, and the transmitter secondary coil 105 and the receiver secondary coil 106 are circular spiral coils with 5.75 loops. The distance at which the maximum resonance state is given is fixed between the transmitter primary coil 104 and the transmitter secondary coil 105 and between the receiver secondary coil 106 and the receiver primary coil 107. The power applied to the power transmitter 101 is 100 W. In the example 1, because the distance between the coils is 5 m, the magnetic field energy between the coils is greater than when the distance between the coils is 17 m as is obvious from the result shown in FIG. 2.

In FIG. 4, a notebook computer 112 and a mobile phone 113 are placed inside the room 201. The notebook computer 112 is placed on a table 202. The mobile phone 113 is placed inside a bag 203. The notebook computer 112 is provided with a receiving coil with a diameter of 15 cm on the backside of its display. The mobile phone 113 is provided with a receiving coil with a diameter of 3 cm. The notebook computer 112 and the mobile phone 113 can receive power from the magnetic field lines 110 that are produced inside the room 201 using their receiving coils. Under such conditions, the received power of 8 mW is obtained in the notebook computer 112. On the other hand, the received power of 1 mW is obtained in the mobile phone 113.

Second Exemplary Embodiment

Figure 5:
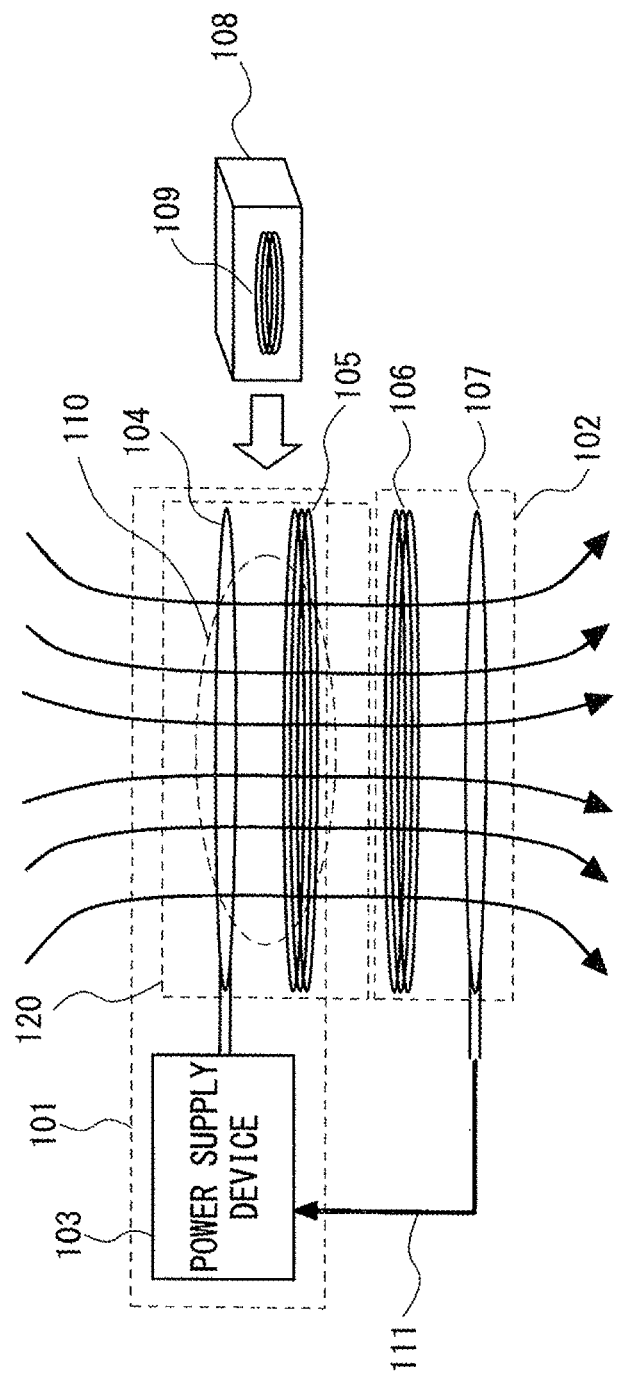
FIG. 5 is a front view schematically showing a configuration of a wireless power feeding system 200 according to a second exemplary embodiment.

Next, a wireless power feeding system 200 according to a second exemplary embodiment of the invention is described hereinafter. The wireless power feeding system 200 is a modified example of the wireless power feeding system 100. FIG. 5 is a front view schematically showing the configuration of the wireless power feeding system 200 according to the second exemplary embodiment. As shown in FIG. 5, the power transmitter 101 is placed to surround the space 120. The other configuration of the wireless power feeding system 200 is the same as that of the wireless power feeding system 100 and not redundantly described.

In the wireless power feeding system 200, an electromagnetic field in the space between the power transmitter 101 and the power receiver 102 can be enhanced just like in the wireless power feeding system 100, though the position of the power transmitter 101 is different. The power receiving body 108 inserted in the space 120 can thereby receive power with high efficiency.

Example 2

Figure 6:
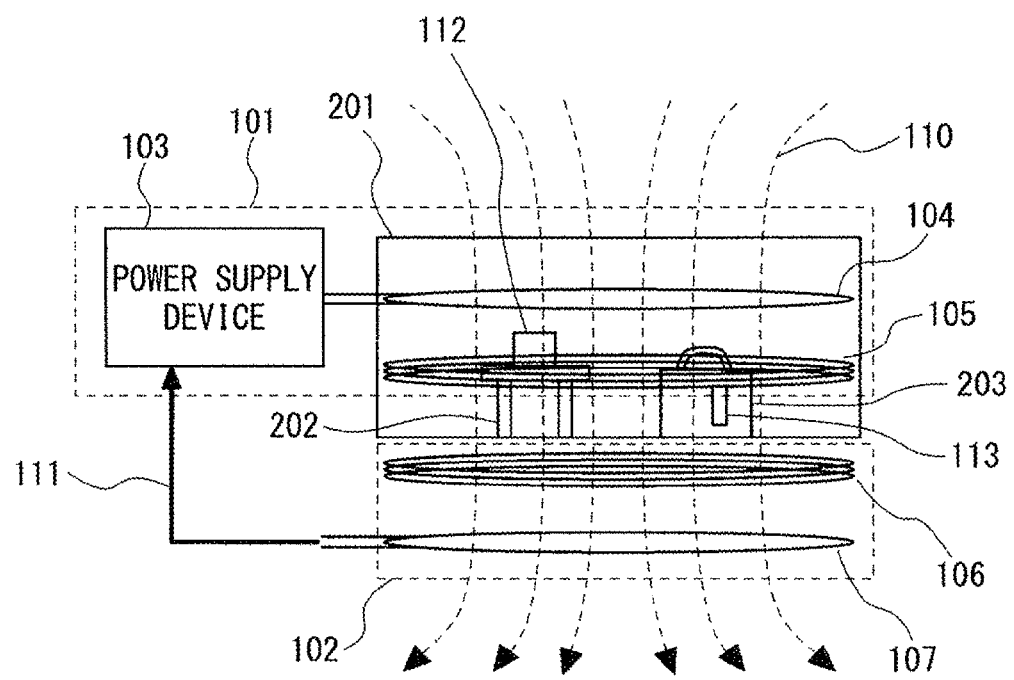
FIG. 6 is a front view schematically showing a configuration example of a wireless power feeding system 2001 according to an example 2.

A wireless power feeding system according to the example 2 of the present invention is described hereinafter. The example 2 relates to a wireless power feeding system 2001, which is an example in the case where the wireless power feeding system 200 is applied to a room in a building. FIG. 6 is a front view schematically showing the configuration example of the wireless power feeding system 2001 according to the example 2. As shown in FIG. 6, the power transmitter 101 is mounted to surround the sidewall of the room 201, and the power receiver 102 is mounted under the floor of the room 201. As in the example 1, the resonant frequency is 1 MHz and the diameter of the coils of the power transmitter 101 and the power receiver 102 is 15 m in the example 2. The distance between the coils of the power transmitter 101 and the power receiver 102 is 1.5 m, and the magnetic field energy is greater than that in the example 1. Note that the forms of the coils included in the power transmitter 101 and the power receiver 102 are the same as those in the example 1. The power applied to the power transmitter 101 is 100 W. In the example 2, the electromagnetic field in the room 201 between the power transmitter 101 and the power receiver 102 can be enhanced just like in the example 1. The power receiving body placed inside the room 201 can thereby receive power with high efficiency.

In FIG. 6, the notebook computer 112 and the mobile phone 113 are placed inside the room 201 just like in the example 1. The notebook computer 112 is placed on the table 202. The mobile phone 113 is placed inside the bag 203. Those power receiving bodies can receive power from the electromagnetic field that is created in the space (inside the room 201) using their coils in the same manner as in the example 1. The amount of power to be received is determined by the coil included in each power receiving body, and each power receiving body can receive the power in conformance with their specification by the rectifier.

The receiving coils in the notebook computer 112 and the mobile phone 113 are the same as those in the example 1 and not redundantly described. Under such conditions, the received power of 9 mW is obtained in the notebook computer 112. On the other hand, the received power of 1.2 mW is obtained in the mobile phone 113.

Third Exemplary Embodiment

Figure 7:
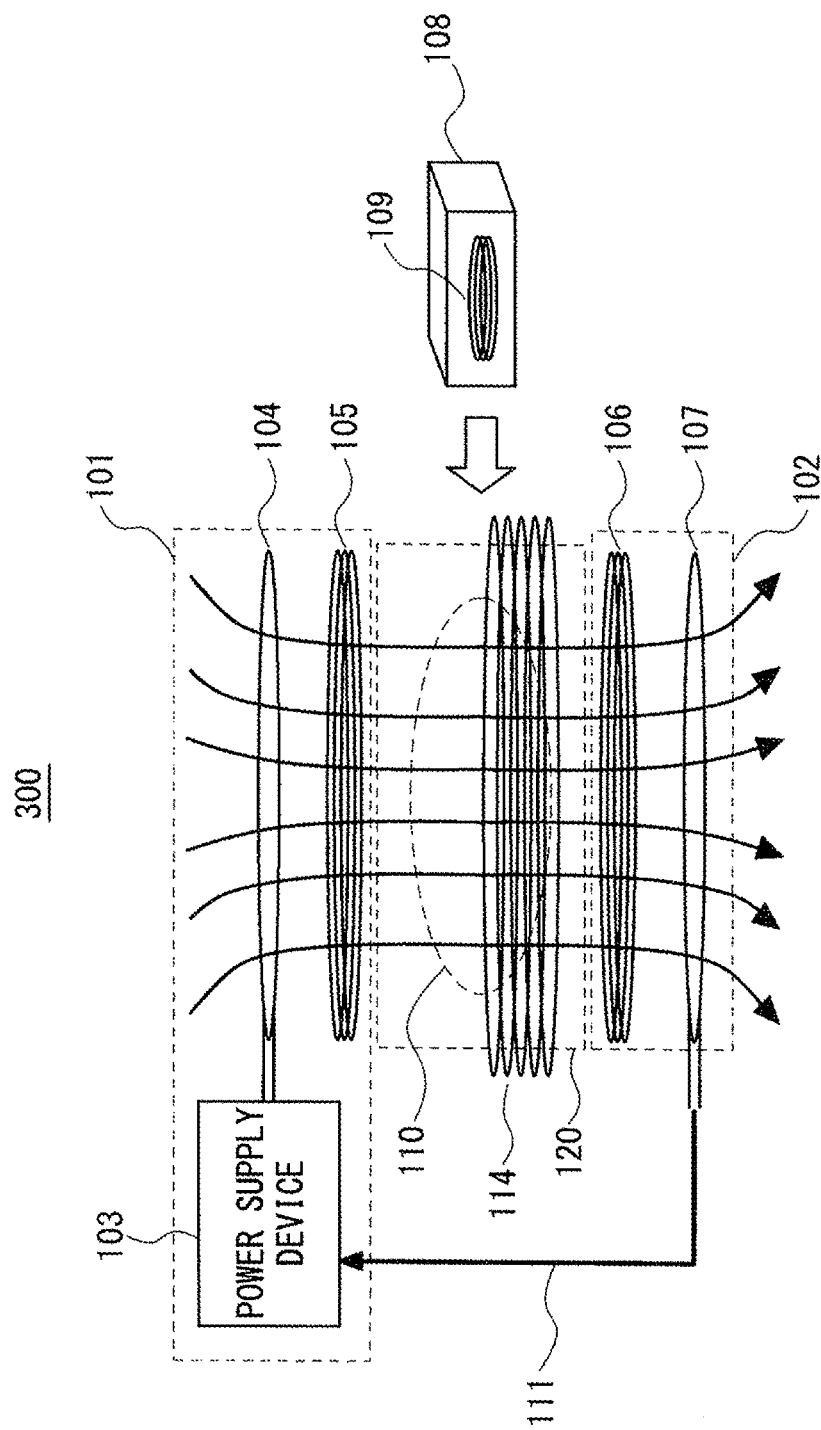
FIG. 7 is a front view schematically showing a configuration of a wireless power feeding system 300 according to a third exemplary embodiment.

A wireless power feeding system 300 according to a third exemplary embodiment of the invention is described hereinafter. The wireless power feeding system 300 is a modified example of the wireless power feeding system 100. FIG. 7 is a front view schematically showing the configuration of the wireless power feeding system 300 according to the third exemplary embodiment. As shown in FIG. 7, in the wireless power feeding system 300, a repeater coil 114 is added to the configuration of the wireless power feeding system 100. The repeater coil 114 is electrically floating.

The repeater coil 114 is placed between the power transmitter 101 and the power receiver 102 in parallel with the power transmitter 101 and the power receiver 102 and surrounding the space 120. In other words, the repeater coil 114 is placed along the plane perpendicular to the magnetic field lines 110. The repeater coil 114, however, is not necessarily placed along the plane strictly perpendicular to the magnetic field lines 110. The repeater coil 114 may be tilted with respect to the magnetic field lines 110 as long as the magnetic field lines can pass though the loop of the repeater coil 114. The other configuration of the wireless power feeding system 300 is the same as that of the wireless power feeding system 100 and not redundantly described.

In the wireless power feeding system 300, the magnetic field energy near the repeater coil 114 can be enhanced by the repeater coil 114. The power receiving body 108 that is inserted in the space 120 can thereby receive power with high efficiency. Particularly, power can be received most efficiently if the repeater coil 114 is placed to surround the region where the power receiving body 108 is likely to exist.

Example 3

Figure 8:
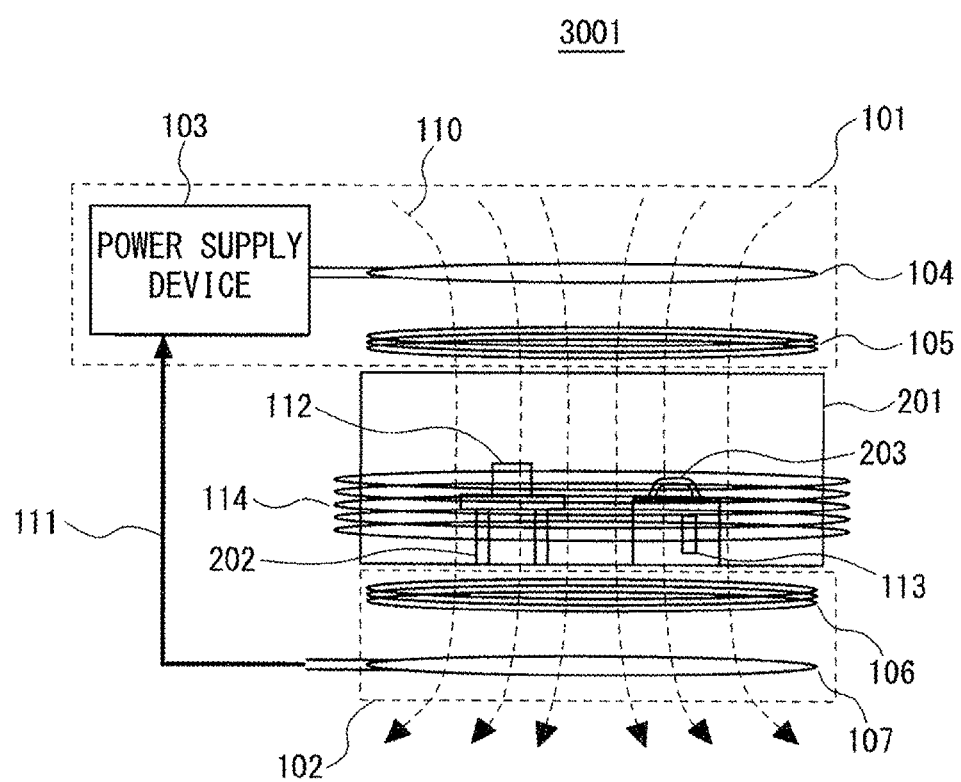
FIG. 8 is a front view schematically showing a configuration example of a wireless power feeding system 3001 according to an example 3.

A wireless power feeding system according to the example 3 of the present invention is described hereinafter. The example 3 relates to a wireless power feeding system 3001, which is an example in the case where the wireless power feeding system 300 is applied to a room in a building. FIG. 8 is a front view schematically showing the configuration example of the wireless power feeding system 3001 according to the example 3. As shown in FIG. 8, in the example 3, the repeater coil 114 is placed on the side surface (wall) of the room near the position of the power receiving body. The distance between the repeater coil 114 and the power receiver 102 is 1 m. As in the example 1, the resonant frequency is 1 MHz in the example 3. The diameter of the coils of the power transmitter 101 and the power receiver 102 is 15 m, and the distance between the coils of the power transmitter 101 and the power receiver 102 is 5 m. The forms and sizes of the coils included in the power transmitter 101 and the power receiver 102 are the same as those in the example 1. The power applied to the power transmitter 101 is 100 W. In the example 3, the electromagnetic field in the room 201 between the power transmitter 101 and the power receiver 102 can be enhanced just like in the example 1. The power receiving body placed inside the room 201 can thereby receive power with high efficiency.

In the example 3, the notebook computer 112 and the mobile phone 113 are placed inside the room 201 just like in the example 1. The notebook computer 112 is placed on the table 202. The mobile phone 113 is placed inside the bag 203. Those power receiving bodies can receive power from the electromagnetic field that is created in the space (inside the room 201) using their coils in the same manner as in the example 1. The amount of power to be received is determined by the coil included in each power receiving body, and each power receiving body can receive the power in conformance with their specification by the rectifier, just like in the example 1.

In the example 3, the magnetic field energy near the repeater coil 114 can be enhanced as a result of adding the repeater coil 114. It is thereby possible to feed power to the power receiving body located near the repeater coil 114 more efficiently. Particularly, it is effective to place the repeater coil 114 in the position where the notebook computer and the mobile phone, which are the power receiving bodies, are likely to be used. Generally, the notebook computer is used by being placed on a table or the like, and the mobile phone is used by being held near the head of a standing or sitting user. In this example, the repeater coil 114 is placed at a distance of 1 m from the floor. Therefore, efficient power feeding is achieved also when the notebook computer and the mobile phone are used in the above matter.

The receiving coils in the notebook computer 112 and the mobile phone 113 are the same as those in the example 1 and not redundantly described. Under such conditions, the received power of 9 mW is obtained in the notebook computer 112. On the other hand, the received power of 1.2 mW is obtained in the mobile phone 113.

Fourth Exemplary Embodiment

Figure 9:
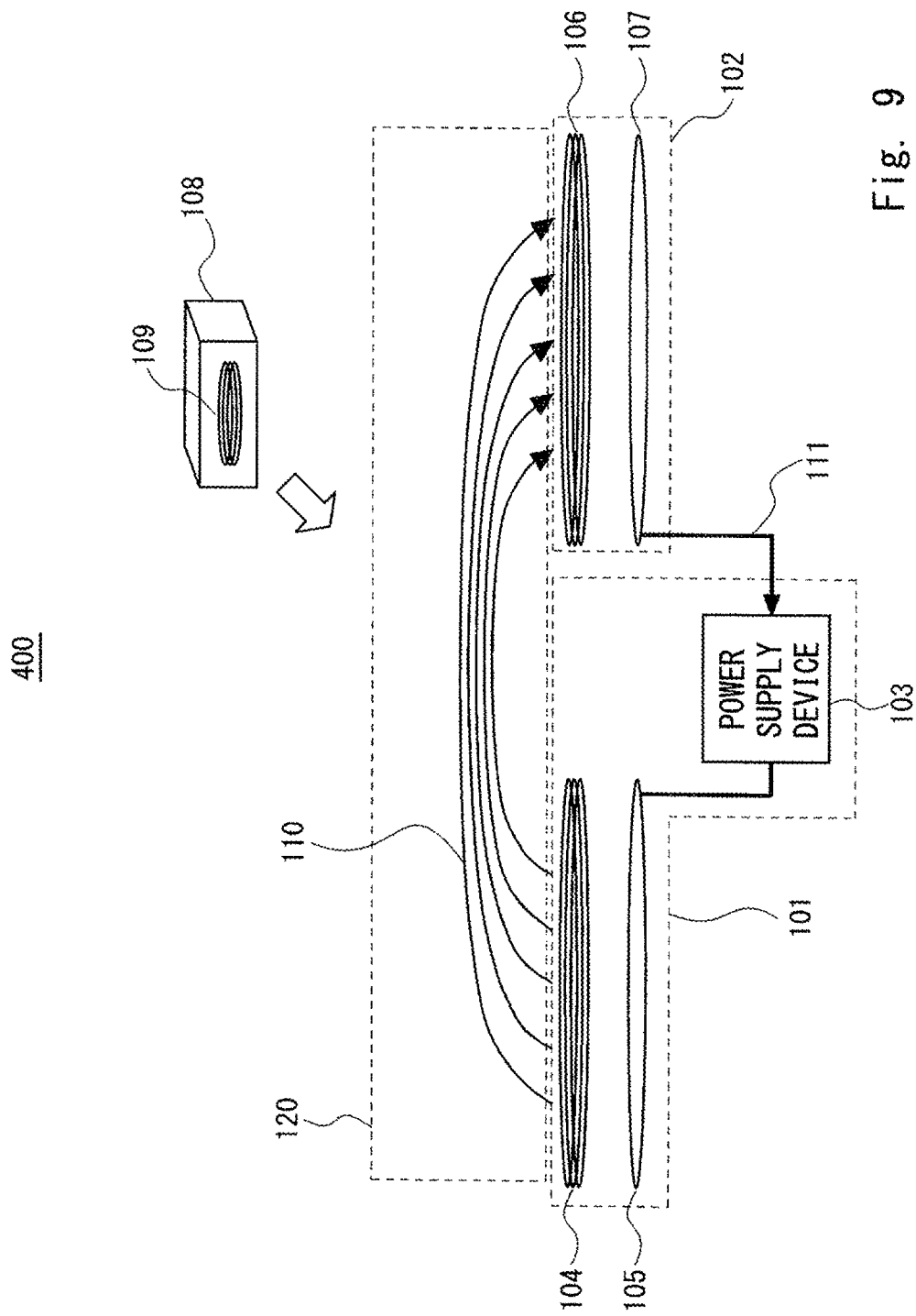
FIG. 9 is a front view schematically showing a configuration of a wireless power feeding system 400 according to a fourth exemplary embodiment.

A wireless power feeding system 400 according to a fourth exemplary embodiment of the invention is described hereinafter. The wireless power feeding system 400 is a modified example of the wireless power feeding system 100. FIG. 9 is a front view schematically showing the configuration of the wireless power feeding system 400 according to the fourth exemplary embodiment. As shown in FIG. 9, in the wireless power feeding system 400, the power transmitter 101 and the power receiver 102 are mounted side by side, rather than facing each other. In general, in the magnetic resonance system, an electromagnetic field can be created in the same manner when the coils are arranged side by side, as when the coils are arranged facing each other.

The power transmitter 101 and the power receiver 102 are both mounted side by side under the space 120. The magnetic field lines 110 are directed upward from the power transmitter 101, then propagate in the horizontal direction, and finally directed downward to reach the power receiver 102. The other configuration of the wireless power feeding system 400 is the same as that of the wireless power feeding system 100 and not redundantly described.

In the wireless power feeding system 400, the power transmitter 101 and the power receiver 102 are mounted side by side under the space 120, so that the electromagnetic field creation range is limited to the underside area of the space 120. Particularly, by transmitting power using a phase difference of electromagnetic waves transmitted from the power transmitter 101, it is possible to create a strong electromagnetic field in a specific region of the space 120. With use of the strong electromagnetic field created in the wireless power feeding system 400, efficient power feeding to the power receiving body 108 is achieved.

Example 4

Figure 10:
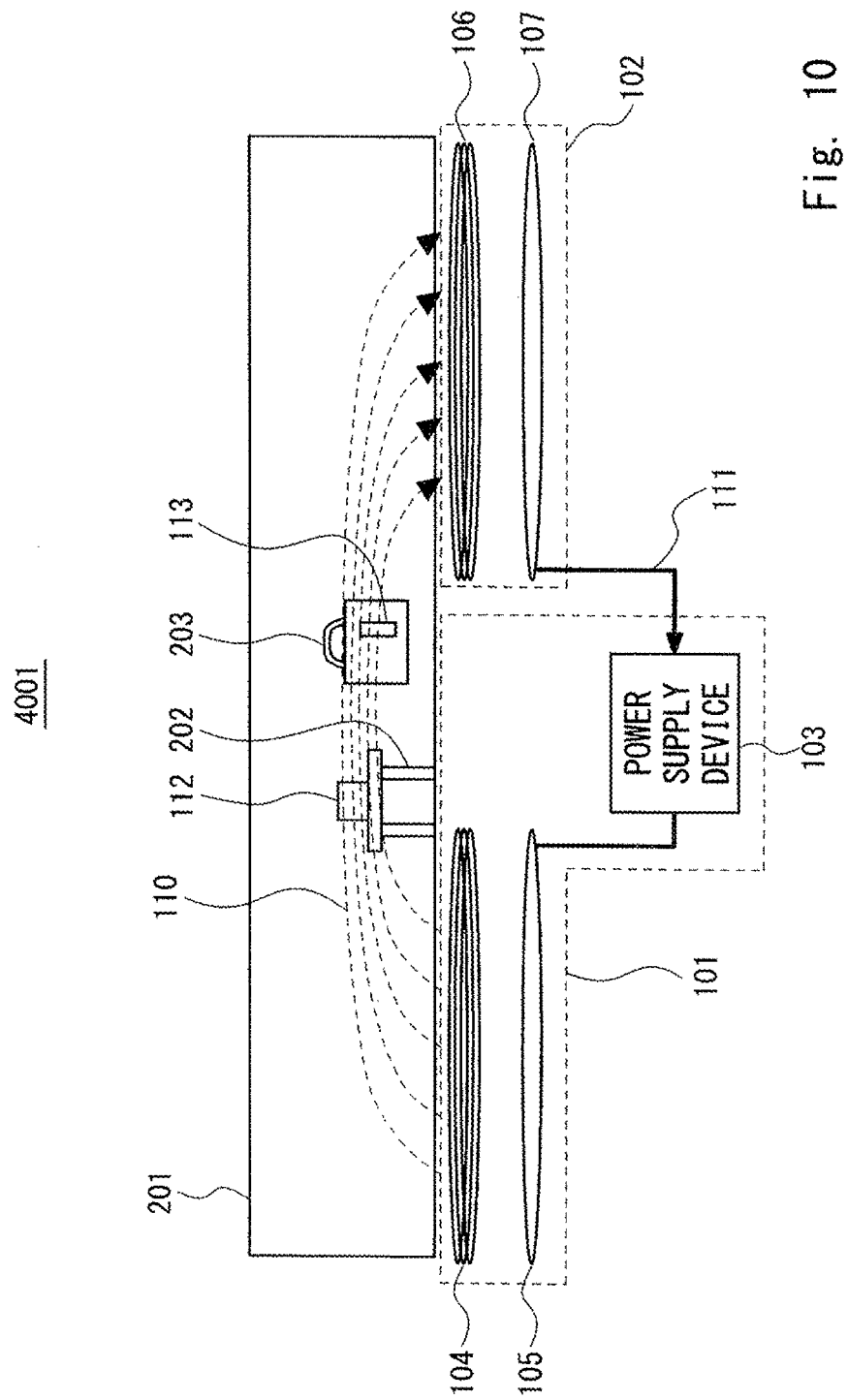
FIG. 10 is a front view schematically showing a configuration example of a wireless power feeding system 4001 according to an example 4.

A wireless power feeding system according to the example 4 of the present invention is described hereinafter. The example 4 relates to a wireless power feeding system 4001, which is an example in the case where the wireless power feeding system 400 is applied to a room in a building. FIG. 10 is a front view schematically showing the configuration example of the wireless power feeding system 4001 according to the example 4. As shown in FIG. 10, the power transmitter 101 and the power receiver 102 are mounted side by side under the floor of the room 201. The resonant frequency of the power transmitter 101 and the power receiver 102 in the example 4 is 1 MHz as in the example 1. The diameter of the coils of the power transmitter 101 and the power receiver 102 is 15 m. The coils of the power transmitter 101 and the power receiver 102 arranged side by side are located at a distance of 5 m in the horizontal direction. In the case where the distance between the coils is 5 m, the transmission efficiency of 90% or more is achieved in the space between the power transmitter 101 and the power receiver 102 as shown in FIG. 2, and this is the same when the two coils are mounted side by side as shown in FIG. 6, not limited to when they are mounted facing each other.

Note that the forms of the coils included in the power transmitter 101 and the power receiver 102 are the same as those in the example 1. The power applied to the power transmitter 101 is 100 W. In the example 4, the electromagnetic field in the space between the power transmitter 101 and the power receiver 102 can be enhanced just like in the example 1. The power receiving body placed inside the room 201 can thereby receive power with high efficiency.

In the example 4, by transmitting power using a phase difference with use of the power transmitter 101 and the power receiver 102 mounted side by side under floor, it is possible to create an electromagnetic field only in the region of up to about 1 m above the floor. It is thus possible to maintain a strong electromagnetic field in the region.

In the example 4, the notebook computer 112 and the mobile phone 113 are placed inside the room 201 just like in the example 1. The notebook computer 112 is placed on the table 202. The mobile phone 113 is placed inside the bag 203. Those power receiving bodies can receive power from the electromagnetic field that is created in the space (inside the room 201) using their coils in the same manner as in the example 1. The amount of power to be received is determined by the coil included in each power receiving body, and each power receiving body can receive the power in conformance with their specification by the rectifier, just like in the example 1.

The receiving coils in the notebook computer 112 and the mobile phone 113 are the same as those in the example 1 and not redundantly described. Under such conditions, the received power of 7 mW is obtained in the notebook computer 112. On the other hand, the received power of 0.9 mW is obtained in the mobile phone 113.

Fifth Exemplary Embodiment

Figure 11:
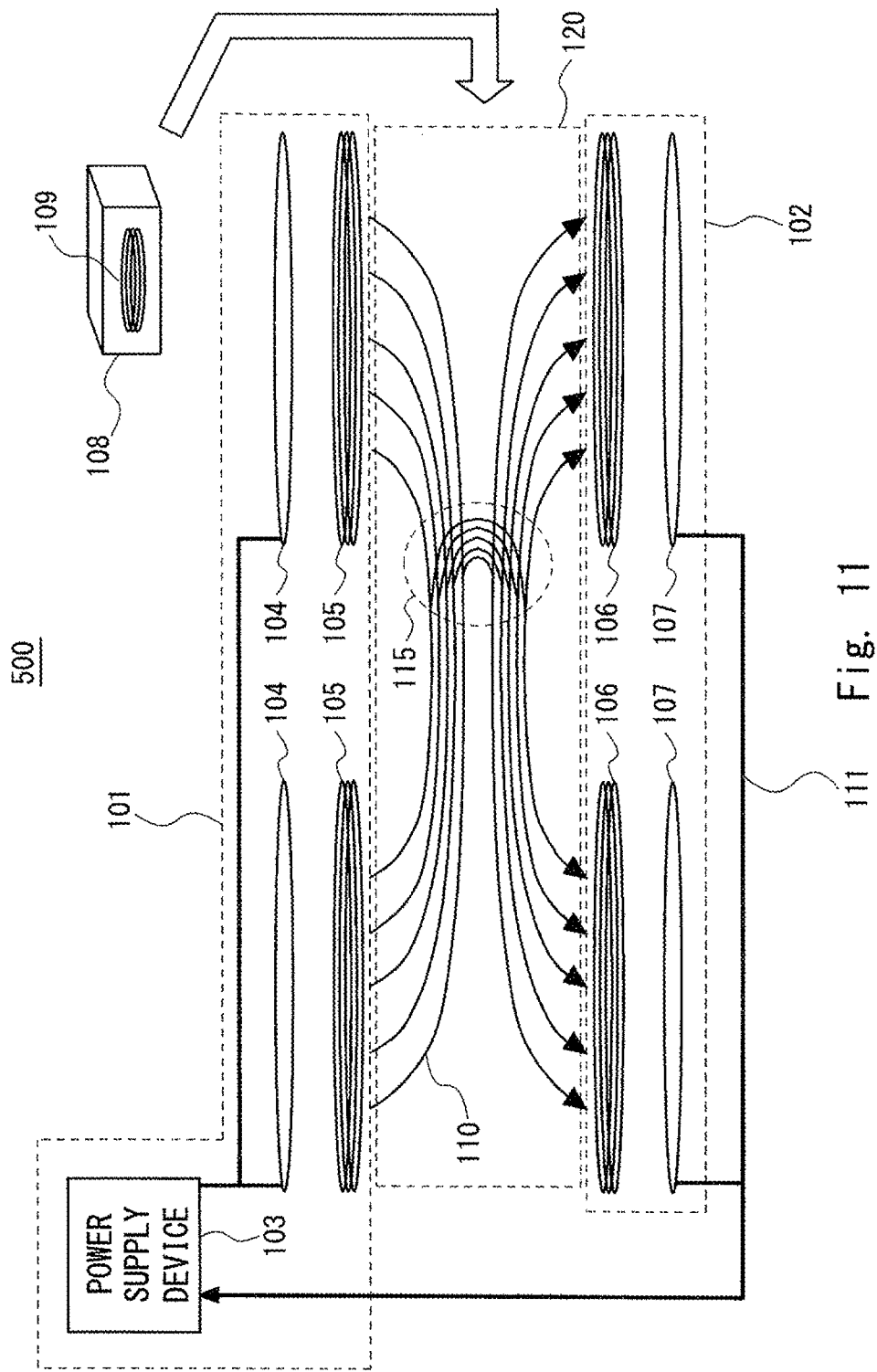
FIG. 11 is a front view schematically showing a configuration of a wireless power feeding system 500 according to a fifth exemplary embodiment.

A wireless power feeding system 500 according to a fifth exemplary embodiment of the invention is described hereinafter. The wireless power feeding system 500 is a modified example of the wireless power feeding system 100. FIG. 11 is a front view schematically showing the configuration of the wireless power feeding system 500 according to the fifth exemplary embodiment. As shown in FIG. 11, the power transmitter 101 includes a plurality of transmitter primary coils 104 and a plurality of transmitter secondary coils 105. The power receiver 102 includes a plurality of receiver secondary coils 106 and a plurality of receiver primary coils 107. In FIG. 11, an example where the power transmitter 101 and the power receiver 102 include two of each type of coils is specifically described.

In the wireless power feeding system 500, the power transmitter 101 is placed above the space 120, and the power receiver 102 is placed below the space 120. The other configuration of the wireless power feeding system 500 is the same as that of the wireless power feeding system 100 and not redundantly described.

In the wireless power feeding system 500, there are a plurality of each type of coils in the power transmitter 101 and the power receiver 102, and the coil in the power receiving body 108 can receive power from electromagnetic waves transmitted from each coil of the power transmitter 101. However, in the case where the distance between the respective coils in the power transmitter 101 and the power receiver 102 is different, when in-phase electromagnetic waves are transmitted, the phases of the electromagnetic waves are shifted from each other in some position of the power receiving body 108, causing reduction of the amount of received power, which is the sum of electromagnetic waves, in some cases. Thus, the received power in the power receiving body 108 is maximized by performing phase difference feeding in consideration of a difference in the distance to the power receiving body 108. In other words, an electric field concentration region 115 can be created by suitable phase difference feeding.

Further, by the phase difference feeding, it is possible to set a region where the received power is high and a region where the received power is low by design. For example, in the case of incorporating the wireless power feeding system 500 into the whole floor of a building, when the building has a double-height lobby at the center of the floor, it is not likely that there is the power receiving body 108 in the double-height lobby. In this case, an efficient power feeding environment can be constructed by making settings so that the electromagnetic field is weak in the double-height lobby and the electromagnetic field is strong in the area around the lobby.

Example 5

Figure 12:
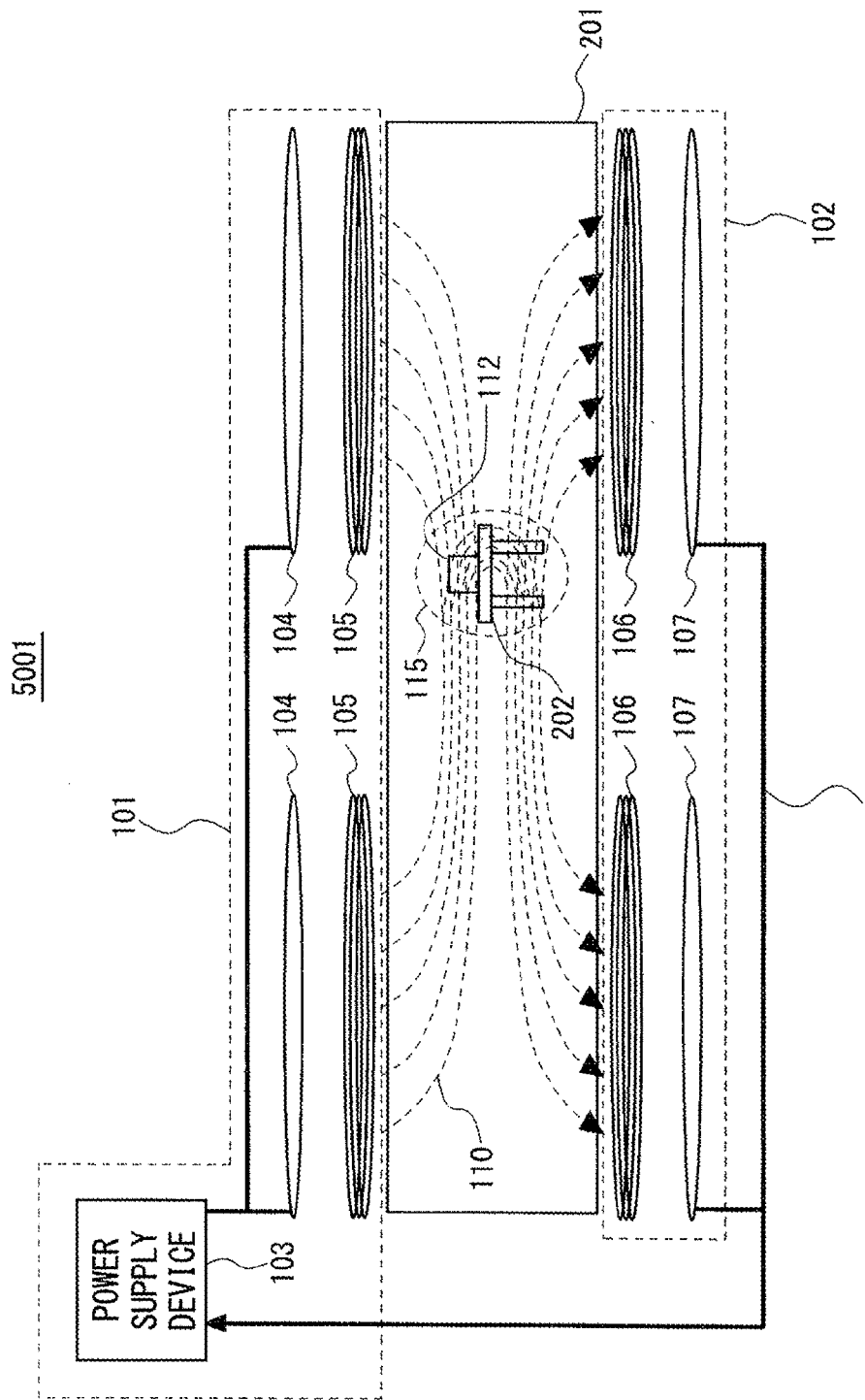
FIG. 12 is a front view schematically showing a configuration example of a wireless power feeding system 5001 according to an example 5.

A wireless power feeding system according to the example 5 of the present invention is described hereinafter. The example 5 relates to a wireless power feeding system 5001, which is an example in the case where the wireless power feeding system 500 is applied to a room in a building. FIG. 12 is a front view schematically showing the configuration example of the wireless power feeding system 5001 according to the example 5. As shown in FIG. 12, in the power transmitter 101, two sets of the transmitter primary coil 104 and the transmitter secondary coil 105 are mounted side by side on the backside of the ceiling of the room 201. In the power receiver 102, two sets of the receiver secondary coil 106 and the receiver primary coil 107 are mounted side by side under the floor of the room 201. As in the example 1, the resonant frequency in the example 5 is 1 MHz. The diameter of the coils of the power transmitter 101 and the power receiver 102 is 15 m. Note that the distance between the power transmitter 101 and the power receiver 102 facing each other is 5 m. Further, the distance between the coils of the power transmitter 101 and the coils of the power receiver 102 arranged side by side in the horizontal direction is 5 m. The forms of the coils included in the power transmitter 101 and the power receiver 102 are the same as those in the example 1. The power applied to the power transmitter 101 is 50 W each.

In the example 5, the notebook computer 112 is placed inside the room 201. The notebook computer 112 is placed on the table 202. Note that, as shown in FIG. 12, the notebook computer 112 is placed in the region where the magnetic field lines 110 are concentrated in the room 201. The notebook computer 112 can receive power from the electromagnetic field that is created in the space (inside the room 201) using its coil in the same manner as in the example 1. The amount of power to be received is determined by the coil included in each power receiving body, and each power receiving body can receive the power in conformance with their specification by the rectifier, just like in the example 1.

The receiving coil in the notebook computer 112 is the same as that in the example 1 and not redundantly described.

Under such conditions, the received power of 8 mW is obtained in the notebook computer 112.

OTHER EXAMPLES

Example 6

Figure 13:
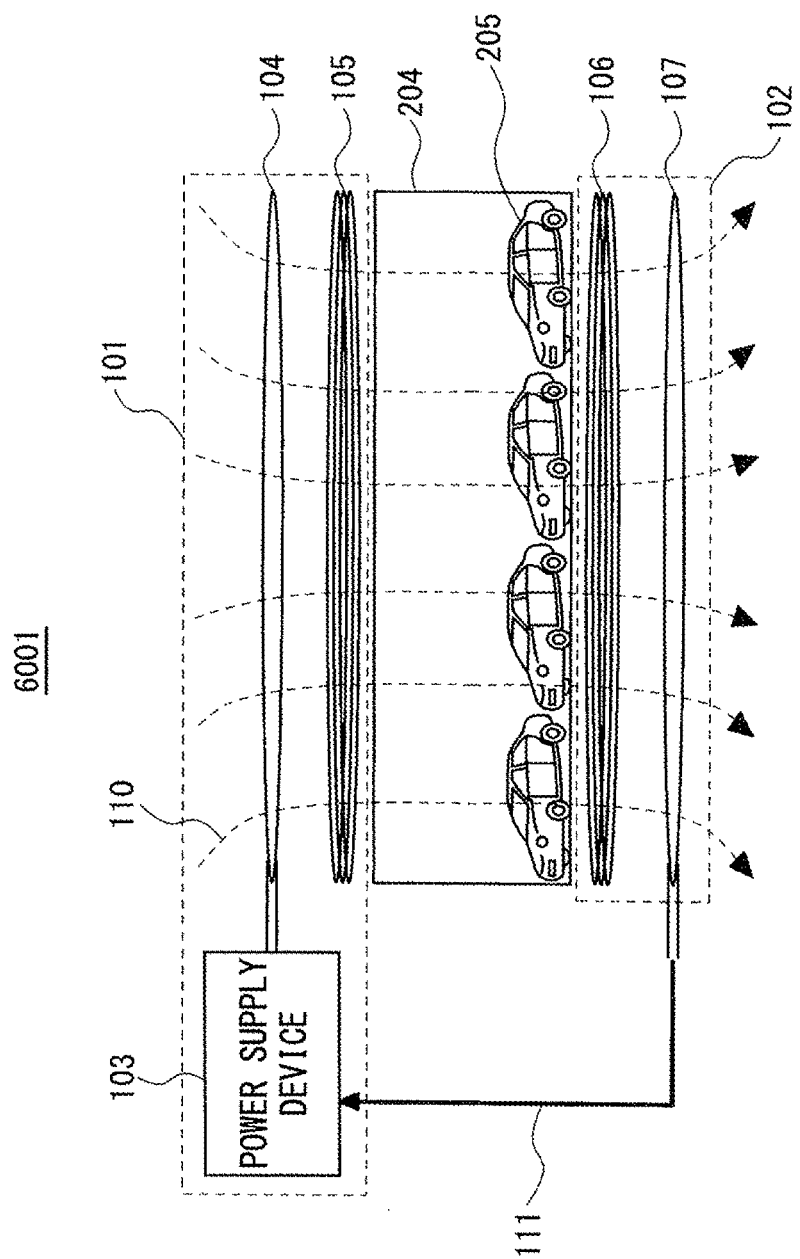
FIG. 13 is a front view schematically showing a configuration example of a wireless power feeding system 6001 according to an example 6.

A wireless power feeding system according to the example 6 of the present invention is described hereinafter. A wireless power feeding system 6001 according to this example is an application of the wireless power feeding system 100. Specifically, the wireless power feeding system 6001 feeds power to a plurality of electric vehicles at a time. FIG. 13 is a front view schematically showing a configuration example of the wireless power feeding system 6001 according to the example 6. As shown in FIG. 13, in the wireless power feeding system 6001, a plurality of electric vehicles 205 are housed in a garage 204, which corresponds to the space 120. Those electric vehicles 205 correspond to the power receiving body 108, and a receiving coil (not shown) is built in each of the electric vehicles 205.

As in the example 1, the resonant frequency in the example 6 is 1 MHz. The diameter of the coils of the power transmitter 101 and the power receiver 102 is 25 m. The distance between the power transmitter 101 and the power receiver 102 is 3 m. The forms of the coils included in the power transmitter 101 and the power receiver 102 are the same as those in the example 1.

In the example 6, power can be fed to a plurality of electric vehicles 205 at a time. At this time, efficient power feeding can be done for the electric vehicles 205 by leaving the garage 204 unattended and creating a strong electromagnetic field. By using a strong electromagnetic field in an unattended state, it is possible to reduce the time required to complete charging of the electric vehicles. Particularly, by using superconducting coils for the coils in the power transmitter 101 and the power receiver 102, it is possible to create a strong electromagnetic field in the garage 204.

Thus, the wireless power feeding system 6001 can be applied to batch power feeding to business electric vehicles (EV) such as taxis in a large garage, batch power feeding to rental electric bicycles in a storage garage and the like, for example. Note that this example is applicable also to power feeding to other transportation equipment that are driven by a battery and a motor such as electric bicycles, not limited to electric vehicles.

Example 7

Figure 14:
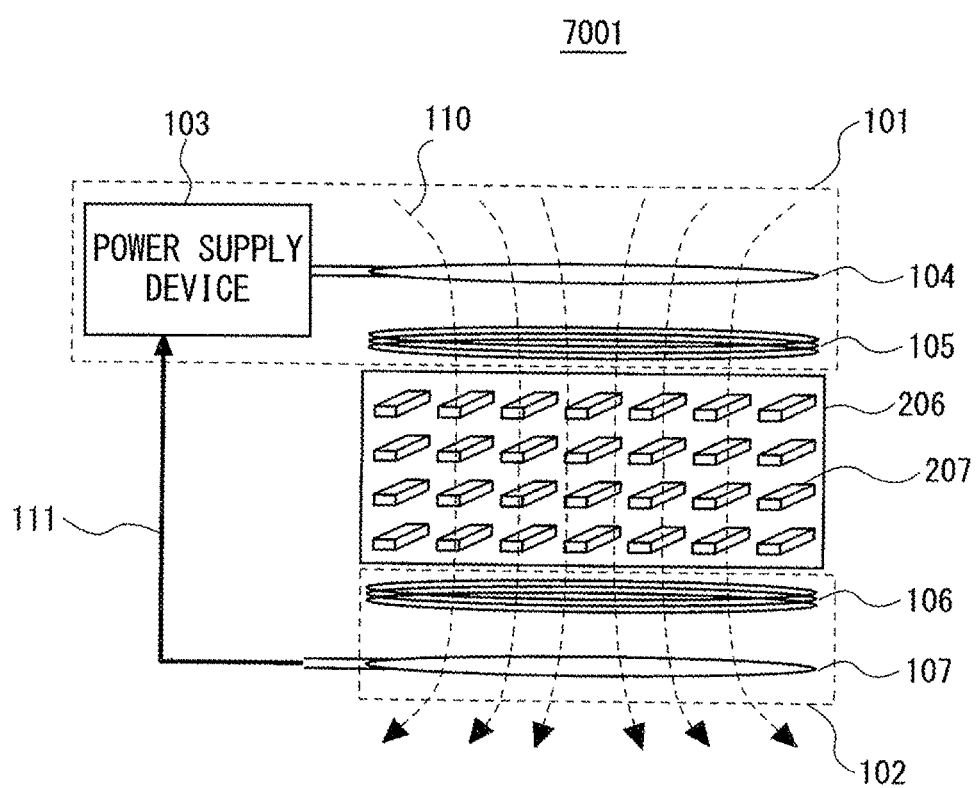
FIG. 14 is a front view schematically showing a configuration example of a wireless power feeding system 7001 according to an example 7.

A wireless power feeding system according to the example 7 of the present invention is described hereinafter. A wireless power feeding system 7001 according to this example is an application of the wireless power feeding system 100. Specifically, the wireless power feeding system 7001 feeds power to portable equipment such as RF-ID tags at a time. FIG. 14 is a front view schematically showing a configuration example of the wireless power feeding system 7001 according to the example 7. As shown in FIG. 14, in the wireless power feeding system 7001, a plurality of RF-ID tags 207 are stored in a feeder box 206, which corresponds to the space 120. Those RF-ID tags 207 correspond to the power receiving body 108, and a receiving coil (not shown) is built in each of the RF-ID tags 207.

The resonant frequency in the example 7 is 1 MHz. The diameter of the coils of the power transmitter 101 and the power receiver 102 is 20 cm. The distance between the power transmitter 101 and the power receiver 102 is 15 cm.

The forms of the coils included in the power transmitter 101 and the power receiver 102 are the same as those in the example 1.

In the example 7, power can be fed to a plurality of RF-ID tags 207 at a time. Thus, the RF-ID tags 207 can be charged automatically simply by storing the RF-ID tags 207 in the feeder box 206 when not using the RF-ID tags 207.

Further, because the diameter of the coils of the power transmitter 101 and the power receiver 102 is 20 cm and the distance between the power transmitter 101 and the power receiver 102 is 15 cm, the size of the feeder box can be about 20 cm. Thus, the wireless power feeding system 7001 can be configured as a system that can be carried by manpower. It is thereby possible to use the wireless power feeding system 7001 by moving it or placing it in an appropriate position indoors without restrictions on place.

Note that the wireless power feeding system 7001 can be applied to applications that charge equipment having a chargeable battery at a time, such as mobile phones, portable music players and digital cameras that can be stored in the feeder box 206, not limited to the RF-ID tags 207. Further, the wireless power feeding system 7001 is also applicable to the case of feeding power to a plurality of educational terminals or the like that are used in a classroom of a school at a time during after-school hours, for example.

Other Exemplary Embodiments

The present invention is not restricted to the above-described exemplary embodiments, and various changes and modifications may be made without departing from the scope of the invention. For example, the number of the power transmitters 101 and the power receivers 102 may be two or more in the first to fourth exemplary embodiments. Further, in the fifth exemplary embodiment, the number of the power transmitters 101 and the power receivers 102 may be three or more. Further, in the first to fifth exemplary embodiments, the number of the power transmitters 101 and the power receivers 102 is not necessarily the same. Likewise, a plurality of coils may be included in the power transmitter 101 and the power receiver 102. Further, the number of coils in the corresponding power transmitter 101 and power receiver 102 is not necessarily the same.

The transmitter primary coil 104 and the transmitter secondary coil 105 in the power transmitter 101 and the receiver secondary coil 106 and the receiver primary coil 107 in the power receiver 102 may be a straight line conductor, a curved conductor, or a conductor composed of straight and curved lines. Further, coils of various forms, such as flat plate coils or sealed coils, not only typical spiral coils, can be used as those coils.

Further, the transmitter primary coil 104 and the transmitter secondary coil 105 in the power transmitter 101 and the receiver secondary coil 106 and the receiver primary coil 107 in the power receiver 102 may be composed of an inductor and a capacitor.

Two or more power receiving bodies 108 may exist in a created electromagnetic field. Further, a plurality of receiving coils 109 may be included in the power receiving body 108. In the case where a plurality of receiving coils are placed in the power receiving body, power obtained in each of the receiving coils may be combined and used as driving power of the power receiving body.

Although a notebook computer, a mobile phone, an electric vehicle and a RF-ID tag are used as an example of the power receiving body in the above-described exemplary embodiments and examples, the power receiving body is not limited to those devices and equipment. For example, it is possible to produce a device having the power receiving function including a coil as a power receiving unit and use it on a device or equipment such as a notebook computer, a mobile phone, an electric vehicle and a RF-ID tag. The power receiving unit produced in this manner can be mounted on various devices and equipment. Further, the power receiving unit can be additionally mounted on the existing devices and equipment.

Although the power transmitter and the power receiver are mounted under the floor and on the backside of the ceiling in the examples 1 to 6, this is just an example. For example, the power transmitter and the power receiver may be mounted on the floor or under the ceiling. In this case, the wireless power feeding system can be installed into the existing room by construction. Further, the power transmitter and the power receiver may be mounted on the inside or outside of the sidewall of a room or a garage. Likewise, in the example 7 also, the power transmitter and the power receiver may be mounted inside the feeder box or on the inside or outside of the sidewall of the feeder box. Further, the power transmitter and the power receiver may be mounted over a plurality of rooms or on the entire floor in the building.

In the above-described exemplary embodiments, a medium that fills the space 120 is not particularly limited. For example, the space 120 may be a vacuum or filled with a specific gas such as air or nitrogen. Further, the space 120 may be filled with liquid such as fresh water or ocean water. Specifically, the space 120 may be filled with a medium as long as the power receiving body 108 can be inserted into the space 120.

Although the room 201, the garage 204 and the feeder box 206 which correspond to the space 120 are described in the above-described exemplary embodiments, those are just examples. The wireless power feeding system according to the above-described exemplary embodiments can be applied to an arbitrary closed structure such as a building and a box structure corresponding to the space 120.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2011-205893, filed on Sep. 21, 2011, the disclosure of which is incorporated herein in its entirety by reference.

REFERENCE SIGNS LIST 100, 200, 300, 400, 500 WIRELESS POWER FEEDING SYSTEM
101 POWER TRANSMITTER
102 POWER RECEIVER
103 POWER SUPPLY DEVICE
104 TRANSMITTER PRIMARY COIL
105 TRANSMITTER SECONDARY COIL
106 RECEIVER SECONDARY COIL
107 RECEIVER PRIMARY COIL
108 POWER RECEIVING BODY
109 RECEIVING COIL
110 MAGNETIC FIELD LINE
111 FEEDBACK LOOP
112 NOTEBOOK COMPUTER

113 MOBILE PHONE
114 REPEATER COIL
115 ELECTRIC FIELD CONCENTRATION REGION
120 SPACE
201 ROOM
202 TABLE
203 BAG
204 GARAGE
205 ELECTRIC VEHICLE
205 ELECTRIC VEHICLE
206 FEEDER BOX
207 RF-ID TAG
1001, 2001, 3001, 4001, 5001, 6001, 7001 WIRELESS POWER
FEEDING SYSTEM

The invention claimed is:

1. A wireless power feeding system comprising:
a power transmitter that generates electromagnetic waves;
a power receiver that is supplied with power by means of the electromagnetic waves received from the power transmitter using an electric field or magnetic field resonance phenomenon; and
a power receiving body that receives power transmitted between the power transmitter and the power receiver by electromagnetic induction, wherein
a resonant frequency of the power receiving body is different from resonant frequencies of the power transmitter and the power receiver.

2. The wireless power feeding system according to claim 1, wherein the power receiver receives power from the electromagnetic field by means of electromagnetic induction.

3. The wireless power feeding system according to claim 1, further comprising:
a feedback loop that connects the power receiver and the power transmitter and feeds the power received by the power receiver back to the power transmitter.

4. The wireless power feeding system according to claim 1, wherein the power transmitter and the power receiver have the same resonant frequency.

5. The wireless power feeding system according to claim 1, wherein
the power transmitter includes at least one transmitter coil, and
the power receiver includes at least one receiver coil.

6. The wireless power feeding system according to claim 5, wherein
the power transmitter includes a plurality of transmitter coils mounted side by side on the same plane, and
the power receiver includes a plurality of receiver coils mounted side by side on the same plane.

7. The wireless power feeding system according to claim 6, wherein the electromagnetic waves transmitted from the plurality of transmitter coils have different phases from one another.

8. The wireless power feeding system according to claim 5, wherein the power transmitter and the power receiver are mounted facing each other at a specified distance.

9. The wireless power feeding system according to claim 5, wherein the power transmitter and the power receiver are mounted side by side on the same plane.

10. The wireless power feeding system according to claim 1, further comprising:
a repeater coil inserted between the power transmitter and the power receiver.

11. The wireless power feeding system according to claim 10, wherein the repeater coil is mounted on a plane perpendicular to a magnetic field line between the power transmitter and the power receiver.

12. The wireless power feeding system according to claim 10, wherein the repeater coil is electrically floating.

13. The wireless power feeding system according to claim 1, wherein the power receiving body includes at least one receiving coil.

14. The wireless power feeding system according to claim 1, wherein the power receiving body is configured as a power receiving unit that can be incorporated into another equipment and supplies power to the equipment.

15. The wireless power feeding system according to claim 1, wherein
a plurality of power receiving bodies are inserted into the electromagnetic field created between the power transmitter and the power receiver.

16. The wireless power feeding system according to claim 1, further comprising:
a closed structure placed between the power transmitter and the power receiver, wherein
a plurality of power receiving bodies are inserted inside the closed structure.

17. The wireless power feeding system according to claim 15, wherein the plurality of power receiving bodies receive power supply at a same time.

18. A wireless power feeding method comprising:
creating an electromagnetic field between a power transmitter and a power receiver using an electric field or magnetic field resonance phenomenon; and
causing the power receiving body to receive power transmitted between the power transmitter and the power receiver by electromagnetic induction, wherein
a resonant frequency of the power receiving body is different from resonant frequencies of the power transmitter and the power receiver.

19. The wireless power feeding system according to claim 1, wherein the power transmitter further comprises:
a power supply device;
a transmitter primary coil that is connected with the power supply device; and
a transmitter secondary coil that is electrically isolated from the transmitter primary coil.

20. The wireless power feeding system according to claim 1, wherein
the power receiver further comprises:
a receiver secondary coil; and
a receiver primary coil that is electrically isolated from the receiver secondary coil.

* * * * *